Jan. 4, 1949. E. W. MOORE 2,458,401
LIGHT SIGNAL FOR RAILROADS
Filed Nov. 2, 1945
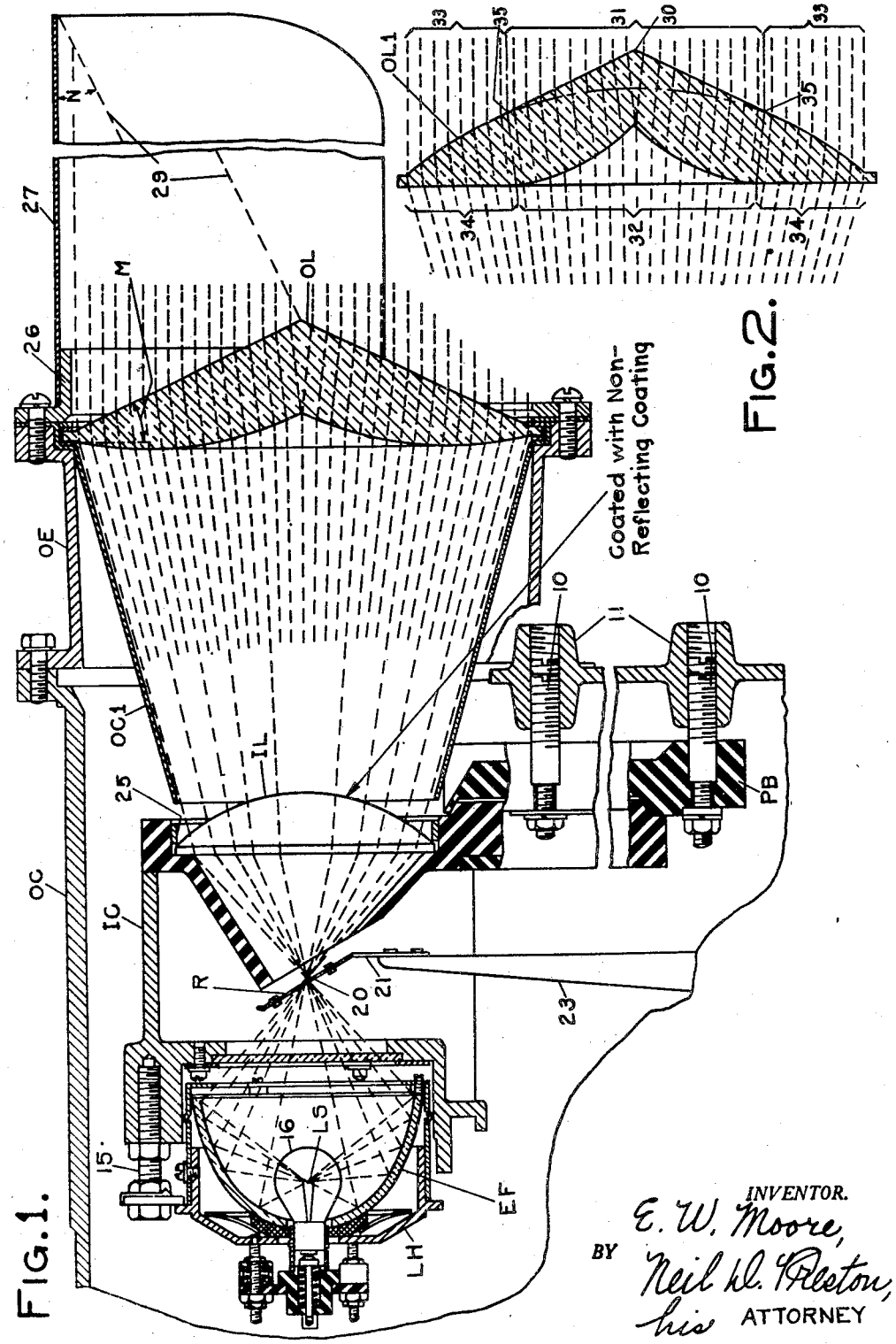
INVENTOR.
E. W. Moore,
BY Neil W. Preston,
his ATTORNEY Patented Jan. 4, 1949

2,458,401

UNITED STATES PATENT OFFICE 2,458,401

LIGHT SIGNAL FOR RAILROADS

Edmund W. Moore, Rochester, N. Y., assignor to General Railway Signal Company, Rochester, N. Y.

Application November 2, 1945, Serial No. 626,348

10 Claims. (Cl. 177—327)

This invention relates to light signals for railway signalling purposes and more particularly to a signal of the type in which reflection from the surfaces of the lens structure of the signal is reduced to a low value and also relates to lenses for such signals.

In search light signals, usually used for railway signalling purposes, of the type under consideration (see Field Patent No. 2,376,534, granted May 22, 1945) the light emitted may be conveniently divided into three components or portions (1) the light produced by the source of light in the signal itself and colored by the color screen and concentrated into a comparatively narrow beam of small spread, (2) the colored light which is emitted into the beam but which is due to external light entering the signal and which is reflected by the reflector, if used, of the signal and is colored by the color screen, and (3) the uncolored light emitted by the signal which enters inside the signal hood from some external source, as from the sun or a headlight, is reflected by the outer or inner lens or from the external face of the color screen, if used. It is this third portion or component of light which is uncolored and reflected by the light signal structure that is attempted to be reduced to a minimum by the present invention. This uncolored reflected light is harmful because it dilutes or reduces the color strength of the light signal beam and thereby renders the signal more difficult to interpret in that white light added to light of any color renders the light less color distinctive.

In view of the foregoing and other important considerations it is proposed, in accordance with the present invention, to so construct the lenses of a light signal that a minimum of uncolored light is reflected therefrom and into the light signal beam.

In accordance with one form of the invention it is proposed to replace the usual plano-convex lens with a lens having an external conical surface, the lens being otherwise designed to perform the same light concentrating or light condensing function that was formerly performed by the plano-convex lens which it replaces.

It is further proposed to use in combination with such a partial or wholly conical outer surface outer lens an inner lens of a plano-convex construction having its outer surface coated with a suitable non-reflecting coating.

In accordance with a modified form of the invention it is proposed to design the outer lens so as to have a conical exterior contour only near the center of the lens.

Other objects, purposes and characteristic features of the invention will appear as the description thereof progresses when read in the light of the accompanying drawings, in which:

Fig. 1 illustrates a signal embodying the present invention; and

Fig. 2 shows a modified form of outer lens embodying the invention in which the reflection reducing feature is applied to the center portion of the lens only.

Structure.—A search light signal of the changeable color type usually involves a spectacle including a plurality of differently colored filter glasses which spectacle may be moved transversely to the light signal beam to allow light of a particular color only to pass. In order to employ comparatively small color screen glasses in such a spectacle the optical structure of the signal is such that all light rays are brought to a focus and so that this spectacle is located near the focus of such light rays, and in order to accomplish this end the light rays emitted by a concentrated filament light source are preferably brought to a focus by an elliptical reflector at one focus of which the filament of the lamp is located and near the other focus of which the spectacle carrying the color screen filters is located. From the foregoing it is of course understood that the light passing through such color screen will be spread at a very wide angle and in order to concentrate this light into a beam of compartively narrow spread one or more light concentrating or condensing lenses are used. A searchlight signal having these latter characteristics is shown in the Field Patent No. 2,376,534, granted May 22, 1945, to which reference may be made and the present invention is an improvement over that disclosed in said Field patent.

Referring to Fig. 1 of the drawings the searchlight signal embodying the present invention may for instance include an outer casing OC, provided with an extension or adapter OE, which is preferably adjustably secured to any suitable signal pole or other signal supporting structure by means not forming a part of the present invention and which has for convenience been omitted. This signal casing OC is provided with a plurality of lugs or bosses 11 suitably threaded, into which are screwed adjusting bolts 10 which support the inner lens support and terminal board PB. The adjustable features including the lugs 11 and bolts 10 enable the inner lens IL, preferably comprising a plano-convex lens as shown, to be adjustably supported with respect to the outer lens OL of special construction which outer lens will be more fully described hereinafter. This terminal board PB has a conic sleeve extending rearwardly from the inner lens IL. This sleeve is provided to further prevent the reflection into the signal beam of uncolored light originating at some external source. The internal surface of this sleeve or shield is of substantially the same shape as the external limits of the signal beam. A similar conic sleeve or shield OCI projects from the outer casing OE and immediately surrounds the bundle of light rays which is projected from the inner lens IL to the outer lens OL. This terminal board PB may also support the inner casing IC in any suitable way. This adjustable support 10—11 enables the inner lens IL to be adjusted along the axis of the optical system and also allows slight adjustments at right angle to such axis. Within this inner casing IC is adjustably supported, as by the adjusting bolt 15, the light projecting housing LH containing an elliptical reflector EF in the focus of which is contained the concentrated filament LS of an incandescent lamp 16. This lamp is adjustably supported in the elliptical reflector EF in any suitable manner the details of which need not be described here in that they are fully described in the above referred to Field patent. Since the reflector EF is elliptical and since the concentrated filament LS is located in one focus thereof it will be understood that the light emitted by this filament and reflected by the reflector EF will again come to a focus at the point 20.

In order to allow light of one color only to be emitted by this light unit, a spectacle 21 preferably containing three glass colored filters G, Y and R, of which only the color filter R has been shown, is supported on a spectacle arm 23 which is pivoted near its lower end and which may be electromagnetically operated in any suitable way (not shown) so as to place any one of the three colored filters G, Y or R in the axis of the searchlight signal beam. As is readily seen the light after having been properly filtered by the color screen R is concentrated to a medium extent by the inner lens IL so as to bring the light beam to a diameter substantially that of the outer lens OL. The outer lens OL then further concentrates this beam into a light beam of comparatively small spread, the spread of this light beam depending on the particular use to which the searchlight signal is applied. If there is straight track ahead the signal beam may be of rather narrow spread whereas if there is a curve ahead a somewhat wider spread of the signal beam will be required. This inner lens IL is preferably held in place as by a bezel ring 25 whereas the outer lens OL may be held in place by a suitable bezel ring 26. In order to exclude as much light as possible from an external source out of the outer signal casing OC a visor, sunshade, or hood 27 is preferably provided. This sunshade 27 obviously cannot keep all of the external light from the outer casing OC in that it must be necessary to emit a beam from this casing. Also, there is a limit as to how long this sunshade 27 may affect the stability of the entire light signal structure. For this reason a sunshade of practical construction and dimensions has been illustrated.

In accordance with one form of the present invention it is proposed to shape the outer lens OL substantially as shown in Fig. 1 of the drawings. As already pointed out it is desired that light reflected from the external surface of the outer lens OL shall not be reflected into the signal beam. In order to obtain this result the external surface of the lens if of conical configuration and the cone of this outer surface is of such steepness that any light that can strike the outer lens from an external source above the axis of the signal when reflected back from the outer surface of the outer lens will be reflected into the underside of the hood or sunshade 27 of the signal. The under surface of this hood is preferably painted a dull black so that very little light, if any, can be reflected therefrom, and if such reflection should take place the reflected light will not enter the signal beam. In other words, the light reflected from the outer lens underneath the hood is to a large extent absorbed or diffused by the hood. In order to satisfy these requirements the cone angle M is so chosen that it substantially agrees with the angle N made by an external light beam passing below the upper edge of the hood 27 and striking the center outer surface of the lens OL with respect to internal surface of this hood, as illustrated by dotted line 29. Having now determined what the conical shape of a portion or all of the outer surface of the outer lens OL shall be it is only necessary to so design the inner surface of the outer lens OL that it will perform the same light concentrating function as was formerly performed by the plano-convex lens which the lens OL of the present invention replaces. It is found that the inner surface of this lens will be substantially of the shape shown in Fig. 1 of the drawings which shows a vertical cross-sectional elevation of the lens taken through the axis of the lens. This internal surface is determined by usual lens design methods and depends on the angle M and the index of the glass used and the extent of spread of beam that is desired. It is readily understood that this inner surface of this outer lens OL will also reflect light to a substantially reduced extent because reflection from an inner smooth surface is much less pronounced than it is from an external surface. Also the internal surface is of such shape, substantially as shown, that a large part of the light which is reflected from this internal surface will not enter the signal beam. A small amount of white light reflected from the inner surface of the outer lens OL will therefore still reach the signal beam but the extent of this white light will have been greatly reduced. It is of course understood that for commercial reasons, especially where molded lenses are used, the internal surface of this outer lens OL may be of the usual stepped type. This is desirable in order to avoid having glass of unusual and extreme thickness near the middle of the lens which is undesirable especially in the case of molded glass lenses.

It has also been experienced that a portion of the small amount of light that is reflected from the outside surface of the inner lens IL will reach the signal beam and this portion of light is of course uncolored and will therefore tend to dilute the color content of the signal beam. In order to reduce this light to a minimum the outer surface of the inner lens IL is preferably coated with a suitable transparent non-reflecting coating, such as is well known in the art. Such a coating is very effective in reducing the reflection of light from a glass surface and since the inner lens IL is protected from the weather it is practicable to use such a coating on the inner lens IL whereas such a coating cannot, as a practical consideration, be used on the outer surface of the outer lens OL. In order to still further reduce dilution of color content of the signal by the reflection of uncolored light into the signal beam the spectacle 21 and the color filters G, Y and R supported thereby are disposed at an acute angle with respect to the optical axis of the signal to thereby prevent reflection of light therefrom into the signal beam. Also, if desired, a cover glass which may or may not include prism structure to produce a so-called close-up indication may supplement the signal disclosed. By close-up indication is meant a diverted beam which in the case of a high signal is directed downward and in the case of a dwarf signal is directed upward.

In Fig. 2 has been shown a modified form of outer lens OLI. This outer lens OLI has its outer surface cone shaped only at those points where a plano-convex lens reflects light from an external source into the signal beam, namely, near the center of the lens. It is readily seen that near the outer portion of a plano-convex lens the angle that the outer surface of the lens makes with the plane of the lens or lens opening is already greater than the angle M (Fig. 1). For this reason it is not necessary to modify the outside surface of the outer lens at points lying outside of those points having a surface of M degrees slope with the plane of the lens. In other words the outer surface of the lens OLI is conic near the center 30 as shown by portion 31 and is convex near the outer edge as shown by the ring portion 33 of considerable width and these surfaces join at points 35 of tangency of these outer convex and inner conic surfaces. The inner or back surface of the lens is of such contour, as shown conventionally, so as to perform the same optical function as was performed by the plano-convex lens which it replaces. That is the inside surface of the outer ring 34 conforms in contour to a plane, the same as would be the case in a plano-convex lens and the inside surface of center portion 32 of the lens (Fig. 2) is substantially of the same shape as is the corresponding portion of the outer lens OL of Fig. 1. Stating this in a different way the outer ring 33—34 of the lens OLI shown in Fig. 2 is of plano-convex design and the center portion 31—32 of this lens OLI has an outer conic surface and has an inner surface of revolution of configuration substantially the same as that of the lens OL of Fig. 1. Obviously the lens of Fig. 2 may be of stepped construction on its inner face so as to avoid undue thickness of glass which must be avoided where lenses are molded and cast in glass or other transparent material.

In both of the lenses shown in Figs. 1 and 2 it may be desirable to round off the apex of the cone slightly. This will not impair the light concentrating function of the lens, in that the center of the lens is a blind spot anyway. It would produce a small amount of reflection, however, but this would be insignificant and if desired the spot resulting from such rounding may be painted with a dull black paint.

Although the novel lenses having external surfaces of contour so as not to reflect light from an external source into the signal beam have been shown applied to a searchlight signal of the type having a movable color screen in the focus of the light beam, it should be understood that this lens may also be used in other forms of light signals well known in the art of railway signalling.

Also, although the inner lens IL may be coated as above described, this inner lens may be left uncoated and may be of a construction similar to that of either of the lenses OL or OLI.

The applicant has thus provided a searchlight signal employing an outer lens and an inner lens in which the outer lens has been constructed to have an outer whole or partial conical surface and the inner lens of which has its outer surface coated by a non-reflecting film coating so that the amount of external light that is reflected from these lenses will be reduced a substantial amount as a result of which the signal emitted will be of considerably superior color content so as to render the signal more distinctive as a result of which it is less apt to be misread. It should be understood that applicant's invention is not limited to the specific design of lens or combination of lenses described or illustrated and that applicant's lens is not limited to a lens having an outer conical surface of the exact angle or extent illustrated and that various other changes, modifications and additions may be made in the exact shape of the lens so long as these changes do not depart from the spirit or scope of the invention and come within the scope of the following claims.

What I claim as new is:

1. In a light signal of the type described, a concentrated source of light, means for collecting a large portion of the light emitted by said source and directing it through a focal point, means near said focal point for allowing the passage only of light of a particular color, an inner lens for concentrating said light of a particular color into a beam of large spread, and an outer lens for concentrating said beam of large spread into a beam of narrow spread, said outer lens having an outer surface of conical contour and an inner surface curved inwardly toward the axis of the lens to an extent to substantially concentrate said beam.

2. In a light signal of the type described, a concentrated source of light, means for collecting a large portion of the light emitted by said source and directing it through a focal point, means near said focal point for allowing the passage only of light of a particular color, an inner lens for concentrating said light of a particular color into a beam of large spread having its outer surface coated with a substantially transparent non-reflecting fiber, and an outer lens for concentrating said beam of large spread into a beam of narrow spread and having an outer surface of conical contour and an inner surface curved inwardly toward the axis of the lens to an extent to substantially concentrate said beam.

3. In a light signal; a lens comprising a generally circular piece of glass having an outer surface and an inner surface through the center of each of which the axis of the lens passes, the outer surface of which lens is of conical contour with the axis of the cone coincident with the axis of the lens and the inner surface of which lens is of a contour to cause parallel rays of light parallel to the axis of said lens which pass through the lens to be brought to a focus in the axis of said lens and a predetermined distance in the rear of the lens; and a sunshade for said lens to limit the angle at which external light originating above the axis of said lens can enter said lens, the steepness of the cone of said lens being such that when external light strikes the conic surface of said lens the reflected light will be reflected at an angle to strike the inner surface of said sunshade.

4. In a light signal of the type described, a concentrated source of light, means for collecting a large portion of the light emitted by said source and directing it through a focal point, a plain color glass disposed at an acute angle to the axis of said lens and near said focal point for allowing the passage only of light of a particular color, an inner lens for concentrating said light of a particular color into a beam of large spread, and an outer lens for concentrating said beam of large spread into a beam of narrow spread, said outer lens having an outer surface of conical contour in which the axis of the cone is coincident with the axis of the lens and an inner surface curved inwardly to an extent to substantially uniformly concentrate said beam.

5. In a light signal of the type described, a concentrated source of light, means for collecting a large portion of the light emitted by said source and directing it through a focal point, a plain color glass disposed at an acute angle to the axis of said lens and near said focal point for allowing the passage only of light of a particular color, an inner lens for concentrating said light of a particular color into a beam of large spread having its outer surface coated with a substantially transparent non-reflecting film, and an outer lens for concentrating said beam of large spread into a beam of narrow spread and having an outer surface of conical contour of which the axis of the cone is coincident with the axis of the outer lens and an inner surface curved inwardly to an extent to uniformly concentrate said beam into a beam of narrow spread.

6. In a light signal; a lens comprising a generally circular piece of glass having an outer surface and an inner surface through the center of each of which the axis of the lens passes, the outer surface of which lens is of conical contour at least for a portion thereof extending equal distances outwardly from the center thereof with the axis of the cone coincident with the axis of the lens and the inner surface of which lens is of a contour to cause parallel rays of light parallel to the axis of said lens which pass through the lens to be brought to a focus in the axis of said lens and a predetermined distance in the rear of the lens; and a sunshade for said lens to limit the angle at which external light originating above the axis of said lens can enter said lens, the steepness of the cone of said lens being such that when external light strikes the conic surface of said lens the reflected light will be reflected at an angle to strike the inner surface of said sunshade.

7. In a light signal of the type described, a concentrated source of light, means for collecting a large portion of the light emitted by said source and directing it to a focal point, a plain-color glass disposed near said focal point at an acute angle to the axis of light emitted from said source to said focal point for allowing the passage only of light of a particular color, an inner lens for concentrating said light of a particular color into a beam of large spread, and an outer lens of optical construction to concentrate said beam of large spread into a beam of narrow spread, said outer lens having an outer surface of conical contour at least for a portion thereof extending equal distances outwardly from the center thereof and in which the axis of the cone is coincident with the axis of the lens.

8. In a light signal of the type described, a concentrated source of light, means for collecting a large portion of the light emitted by said source and directing it to a focal point, a plain color glass disposed near said focal point at an acute angle to the axis of light emitted from said source to said focal point for allowing the passage only of light of a particular color, an inner lens for concentrating said light of a particular color into a beam of large spread having its outer surface coated with a non-reflecting film, an outer lens of optical construction to concentrate said beam of large spread into a beam of narrow spread and having an outer surface of conical contour of which the axis of the cone is coincident with the axis of the outer lens, a sunshade to prevent light from the sun entering said outer lens at a greater than a predetermined angle with respect to the axis of said outer lens, the conical contour of the outer surface being sufficiently steep so that any light from the sun striking said surface and reflected therefrom will strike the underside of said sunshade.

9. In a light signal, the combination with means for emanating rays of colored light from a central point, of a condenser lens for concentrating said rays into a colored light beam of narrow spread having its optical axis extending through said central point, said lens having a protruding conical outer surface concentric with the axis of said lens, the pitch of said conical surface being sufficient to cause substantially all rays of light to strike said conical surface at a substantial angle of incidence from a beam of light substantially parallel to the axis of said lens and originating from an extraneous light source, whereby substantially all light rays of said beam from said extraneous light source are reflected away from the axis of said lens at a substantial angle to prevent dilution of said colored light beam, and said lens having an inner surface curved inwardly toward the axis of the lens to an extent to uniformly concentrate said beam into a beam of narrow spread.

10. A color light signal comprising a concentrated source of colored light, and a condenser lens for concentrating rays of light from said source into a colored light beam of narrow spread, said lens comprising an outer conical surface having a concentrated apex on the axis of said lens, the pitch of said conical surface being sufficient to form a substantial angle of incidence for substantially all light rays striking the surface of said cone from an extraneous source relatively close to the axis of said lens, and said lens having an inner surface curved inwardly toward the axis of the lens to an extent to uniformly concentrate said beam into a beam of narrow spread.

EDMUND W. MOORE.

REFERENCES CITED

The following references are of record in the file of this patent:

UNITED STATES PATENTS

| Number | Name | Date |
|---|---|---|
| 1,363,566 | Churchill | Dec. 28, 1920 |
| 1,627,895 | Handlan | May 10, 1927 |
| 1,840,098 | Hobson | Jan. 5, 1932 |
| 1,932,022 | O'Hagan | Oct. 24, 1933 |
| 1,969,089 | Merkel | Aug. 7, 1934 |
| 2,068,805 | Lebby | Jan. 26, 1937 |
| 2,333,967 | Wells | Nov. 9, 1943 |
| 2,365,474 | Kellogg et al. | Dec. 19, 1944 |